United States Patent
Pilarz et al.

(10) Patent No.: US 9,233,803 B2
(45) Date of Patent: Jan. 12, 2016

(54) CROSSBELT SORTER SYSTEM AND METHOD OF SORTING ARTICLES

(71) Applicant: Dematic Corp., Grand Rapids, MI (US)

(72) Inventors: Nolan R. Pilarz, Walker, MI (US);
Dennis J. Schuitema, Ada, MI (US);
Philipp J. Hortig, Rockford, MI (US);
Paul L. Wetters, Rockford, MI (US);
Roderick C. Hunt, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 32 days.

(21) Appl. No.: 13/939,512

(22) Filed: Jul. 11, 2013

(65) Prior Publication Data

US 2014/0014468 A1 Jan. 16, 2014

Related U.S. Application Data

(60) Provisional application No. 61/670,151, filed on Jul. 11, 2012.

(51) Int. Cl.
*B65G 47/53* (2006.01)
*B65G 17/34* (2006.01)
*B65G 47/96* (2006.01)

(52) U.S. Cl.
CPC .............. *B65G 47/53* (2013.01); *B65G 17/345* (2013.01); *B65G 47/96* (2013.01)

(58) Field of Classification Search
CPC ...................................................... B65G 47/53
USPC .................. 198/370.01, 370.03, 370.06, 778
See application file for complete search history.

(56) References Cited

U.S. PATENT DOCUMENTS

| 5,161,930 A | 11/1992 | Canziani |
| 5,220,986 A | 6/1993 | Winkler, III |

(Continued)

FOREIGN PATENT DOCUMENTS

| EP | 0930248 B1 | 7/1999 |
| EP | 0963926 B1 | 8/2003 |

(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US2013/050042, mailed Dec. 16, 2013.

(Continued)

*Primary Examiner* — Douglas Hess
(74) *Attorney, Agent, or Firm* — Gardner, Linn, Burkhart & Flory, LLP

(57) ABSTRACT

A crossbelt sorter system and method of sorting articles includes a track assembly and a plurality of carriers attached to each other to travel along the track assembly. Each of the carriers includes at least front and rear corner portions thereof and a trolley at each of the front and rear corner portions. Each trolley is configured to travel along the track assembly. A hitch assembly joins adjacent ones of the carriers. A propulsion system propels the carriers along the track assembly. Each trolley is mounted to the associated carrier to pivot in at least two different directions. In this manner, the track assembly may have one or more spiral portions thereof. Each trolley is adapted to pivot in the two different directions to support the associated carrier as it moves through the spiral portion.

26 Claims, 18 Drawing Sheets

(56) References Cited

U.S. PATENT DOCUMENTS

| | | |
|---|---|---|
| 5,367,466 A | 11/1994 | Canziani |
| 5,372,234 A | 12/1994 | Fortenbery et al. |
| D361,709 S | 8/1995 | Fortenbery |
| 5,588,520 A | 12/1996 | Affaticati et al. |
| 5,690,209 A | 11/1997 | Kofoed |
| 5,701,992 A | 12/1997 | Enomoto |
| 5,803,230 A | 9/1998 | Canziani et al. |
| 5,826,704 A | 10/1998 | Van Den Goor |
| 5,836,436 A | 11/1998 | Fortenbery et al. |
| 5,894,919 A | 4/1999 | Tacchi et al. |
| 5,901,830 A | 5/1999 | Kalm et al. |
| 6,003,656 A | 12/1999 | Fortenbery |
| 6,009,992 A | 1/2000 | Erceg et al. |
| 6,050,390 A | 4/2000 | Fortenbery et al. |
| 6,095,314 A | 8/2000 | Fortenbery |
| 6,112,879 A | 9/2000 | Fortenbery et al. |
| 6,158,568 A | 12/2000 | Erceg et al. |
| 6,206,170 B1 | 3/2001 | Kissel et al. |
| 6,209,703 B1 | 4/2001 | Soldavini |
| 6,220,426 B1 | 4/2001 | Giana |
| 6,244,423 B1 | 6/2001 | Tacchi et al. |
| 6,253,901 B1 | 7/2001 | Hintz et al. |
| 6,253,904 B1 | 7/2001 | Soldavini |
| 6,253,910 B1 | 7/2001 | Axmann |
| 6,273,268 B1 | 8/2001 | Axmann |
| 6,298,975 B1 | 10/2001 | Fortenbery et al. |
| 6,360,868 B1 | 3/2002 | Arlt et al. |
| 6,367,610 B1 | 4/2002 | Fortenbery et al. |
| 6,371,275 B1 * | 4/2002 | Terrell et al. ............ 198/367 |
| 6,382,392 B1 | 5/2002 | Fortenbery et al. |
| 6,478,138 B1 | 11/2002 | Edwards et al. |
| 6,484,866 B1 | 11/2002 | Fortenbery et al. |
| 6,499,582 B1 | 12/2002 | Gillott |
| 6,571,933 B1 | 6/2003 | Gortz et al. |
| 6,585,101 B2 | 7/2003 | Edwards et al. |
| 6,715,599 B1 | 4/2004 | Fortenbery et al. |
| 6,736,254 B1 | 5/2004 | Fortenbery et al. |
| 6,796,417 B2 | 9/2004 | Soldavini et al. |
| 6,820,561 B2 | 11/2004 | Soldavini et al. |
| 6,889,814 B2 | 5/2005 | Cerutti et al. |
| 6,899,217 B1 | 5/2005 | Fortenbery et al. |
| 6,938,750 B2 | 9/2005 | Miller et al. |
| 6,997,666 B1 | 2/2006 | Rodgers et al. |
| 7,032,741 B1 | 4/2006 | Fortenbery et al. |
| 7,080,725 B2 | 7/2006 | Hishinuma |
| 7,104,387 B2 * | 9/2006 | Brixius et al. ............ 198/370.06 |
| 7,145,095 B2 * | 12/2006 | Cerutti et al. ............ 209/584 |
| 7,232,029 B1 | 6/2007 | Benedict et al. |
| 7,588,140 B2 | 9/2009 | van den Goor et al. |
| 7,597,185 B1 | 10/2009 | Fortenbery et al. |
| 7,604,448 B2 * | 10/2009 | Balk et al. ............ 414/331.03 |
| 7,681,710 B2 | 3/2010 | Kuhn et al. |
| 7,753,191 B2 | 7/2010 | Lykkegaard et al. |
| 7,757,842 B1 | 7/2010 | Fortenbery et al. |
| 7,806,254 B2 | 10/2010 | Brayman et al. |
| 8,196,737 B2 | 6/2012 | Brayman et al. |
| 8,770,379 B2 * | 7/2014 | Van Den Goor et al. 198/370.02 |
| 2003/0168312 A1 | 9/2003 | Veit et al. |
| 2009/0287346 A1 | 11/2009 | Hirsch et al. |
| 2010/0175967 A1 | 7/2010 | Lykkegaard |
| 2010/0176663 A1 | 7/2010 | Lykkegaard |
| 2012/0012438 A1 | 1/2012 | Heitplatz |

FOREIGN PATENT DOCUMENTS

| | | |
|---|---|---|
| EP | 1362804 A1 | 11/2003 |
| EP | 1375390 A2 | 1/2004 |
| EP | 1124650 B1 | 4/2004 |
| EP | 1352859 B1 | 12/2004 |
| EP | 1216938 B1 | 10/2005 |
| EP | 1302416 B1 | 12/2005 |
| EP | 1426312 B1 | 2/2006 |
| EP | 2030918 A1 | 3/2009 |
| EP | 1473205 B1 | 7/2010 |
| EP | 1970131 B1 | 9/2010 |
| GB | 528839 A | 11/1940 |

OTHER PUBLICATIONS

International Preliminary Report on Patentability from corresponding Patent Cooperation Treaty Patent Application No. PCT/US2013/050042 issued Jan. 15, 2015.

\* cited by examiner

CROSSBELT SORTER SYSTEM AND METHOD OF SORTING ARTICLES

CROSS-REFERENCE TO RELATED APPLICATIONS

This application claims priority to U.S. provisional patent application Ser. No. 61/670,151 filed Jul. 11, 2012, the disclosure of which is hereby incorporated herein by reference in its entirety.

BACKGROUND OF THE INVENTION

The present invention is directed to article-handling systems and methods and, in particular, to such systems and methods utilizing a crossbelt sorter and method of sorting articles.

Article sortation is useful in many industries, including parcel and postal handling, article warehousing, and product distribution to name but a few. A crossbelt sorter utilizes a short section of conveyor belt that is mounted along with a drive motor to a carriage that is coupled with other carriages to travel along a track. The conveyor belt is oriented to convey articles in a direction that is perpendicular to the motion of travel of the carriages, which leads to the designation of a crossbelt sorter. Articles can be positioned on the conveyor belt or discharged from the conveyor belt while the carriages continue in motion by operating the belt in one of opposite directions. Articles can be positioned on the conveyor belts in conjunction with a powered induct to load articles. Articles can be discharged from the conveyor belts to one of a plurality of discharge locations to sort the articles. The discharge locations can include chutes, gravity conveyors, powered conveyors, or the like.

SUMMARY OF THE INVENTION

The present invention provides a crossbelt sorter system and method of sorting articles that is extremely flexible in configuration and operation.

A crossbelt sorter system and method of sorting articles, according to an aspect of the invention, includes a track assembly and a plurality of carriers attached to each other to travel along the track assembly. Each of the carriers includes at least front and rear corner portions thereof. Trolleys support the front corner portions and/or rear corner portions of the carrier. Each trolley is mounted to the associated carrier to pivot in at least two different directions. In this manner, the track assembly may have one or more spiral portions thereof. Each trolley is adapted to pivot in the two different directions to support the associated carrier as it moves through the spiral portions. A propulsion system propels the carriers along the track assembly.

Each trolley may be mounted with a spherical bearing in order to pivot that trolley in the two different directions. A biasing member may be provided to bias that trolley into lateral engagement with said track assembly. The biasing member may also absorb changes in vertical loading in order to assist the associated carrier moving through spiral portions. An override may be provided that allows the biasing member to be disconnected for separation of the associated trolley from the track assembly. The trolley may include a travel limit to limit movement of the trolley in the two directions. An override may be provided to allow the travel limit to be bypassed. The travel limit may include a lock collar and strike plate that engage each other to limit movement of the trolley. One of the lock collar and strike plate may be mounted for movement with the spherical bearing and the other mounted to the carriage. The override allows the lock collar and strike plate to be separated from each other. A vertical biasing member may be provided to bias the lock collar toward the strike plate.

Each trolley may include a plurality of wheels and a bogie bracket mounting said wheels. The bogie bracket is made substantially from a polymer. The wheels may be made substantially from a polymer. In particular, the wheels may include a polymeric tire formed to a steel bearing.

A cross-belt sorter system and method of sorting articles, according to another aspect of the invention, includes a track assembly and a plurality of carriers attached to each other to travel along the track assembly. Each of the carriers includes at least front and/or rear corner portions thereof and a trolley at each of the front and/or rear corner portions. Each trolley is configured to travel along the track assembly. A hitch assembly joins adjacent ones of the carriers. A propulsion system propels the carriers along the track assembly.

The track assembly may include at least two rails that are made substantially from a particular material. Each of the carriers may include a connection member extending between the hitch assemblies at opposite ends of that carrier. The connection members and hitch assemblies may be made substantially from the same particular material as the track assembly. This provides thermal expansion and contraction of the carriers that is compatible with thermal expansion and contraction of the track assembly. The rails may have a surface shape that is at least partially circular in cross section and wherein each of the trolleys may have one or more V-oriented sets of upper wheels at an upper portion of the trolley. The upper wheels may each be mounted on a plane that intersects the plane of the other of said upper wheels. At least one lower wheel may be provided below the upper wheels on each of the trolleys.

The propulsion system may include a drive fin attached to the connection member. The drive fin is propelled by a prime mover to propel the carriers. The drive fin may be made from another particular material that is different from the material making up the rails. The thermal expansion and contraction characteristics of the fin material are different from the expansion and contraction characteristics of the particular material making up the rails. The drive fin may be attached to the connection member with a slip joint.

A cross-belt sorter system and method of sorting articles, according to another aspect of the invention, includes a track assembly and a plurality of carriers attached to each other to travel along the track assembly. The carriers include a lower carriage portion that is attached to the lower carriage portions of adjacent carriers and at least one upper carriage portion that is separately attached to the lower carriage portion. The upper carriage portion includes a motorized roller, another roller, a support for said rollers and a conveyor belt reeved about the rollers. A propulsion system propels the carriers along the track assembly.

Mounts may be provided to support the motorized roller. Each of the mounts may include a polymeric sleeve supporting an end of the motorized roller. Each of the mounts may further include an axel retainer that is connected with an end of the motorized roller and that is supported by the polymeric sleeve. The axle retainer may be adjustably connected with the end of the motorized roller.

Two or more of the upper carriage portions may be provided on one lower carriage portion.

A divert trigger may be provided to prompt the conveyor belt to discharge a load thereon to a particular location along the track assembly. The divert trigger may be a flag on the carrier or track assembly, or vice versa, that is adapted to selectively interrupt a photo beam at the other of the carrier or track. The flag blocks the photo beam to prompt the conveyor belt to discharge a load thereon. The flag may be a moveable opaque member that is selectively moveable into path of movement of the photo beam or a switchable liquid crystal device.

A crossbelt sorter system and method of sorting articles, according to yet another aspect of the invention, includes a track assembly and a plurality of carriers attached to each other to travel along the track assembly. A plurality of trolleys support the carriers and move along the track assembly. A propulsion system propels the carriers along the track assembly. The propulsion system includes at least one travelling member that extends along a portion of the track assembly and engages at least some of the trolleys to propel the carriers.

The track assembly may be made up of two or more spaced apart rails and the propulsion system includes two or more travelling members, each extending along a portion of each of the rails. The travelling member comprises an endless travelling belt. The travelling member may include a force-reinforcing mounting. The force-reinforcing mounting may be responsive to relative movement with one of said trolleys to increase force of contact between the travelling member and the contact made with the trolleys.

These and other objects, advantages and features of this invention will become apparent upon review of the following specification in conjunction with the drawings.

DESCRIPTION OF THE PREFERRED EMBODIMENT

Figure 1:
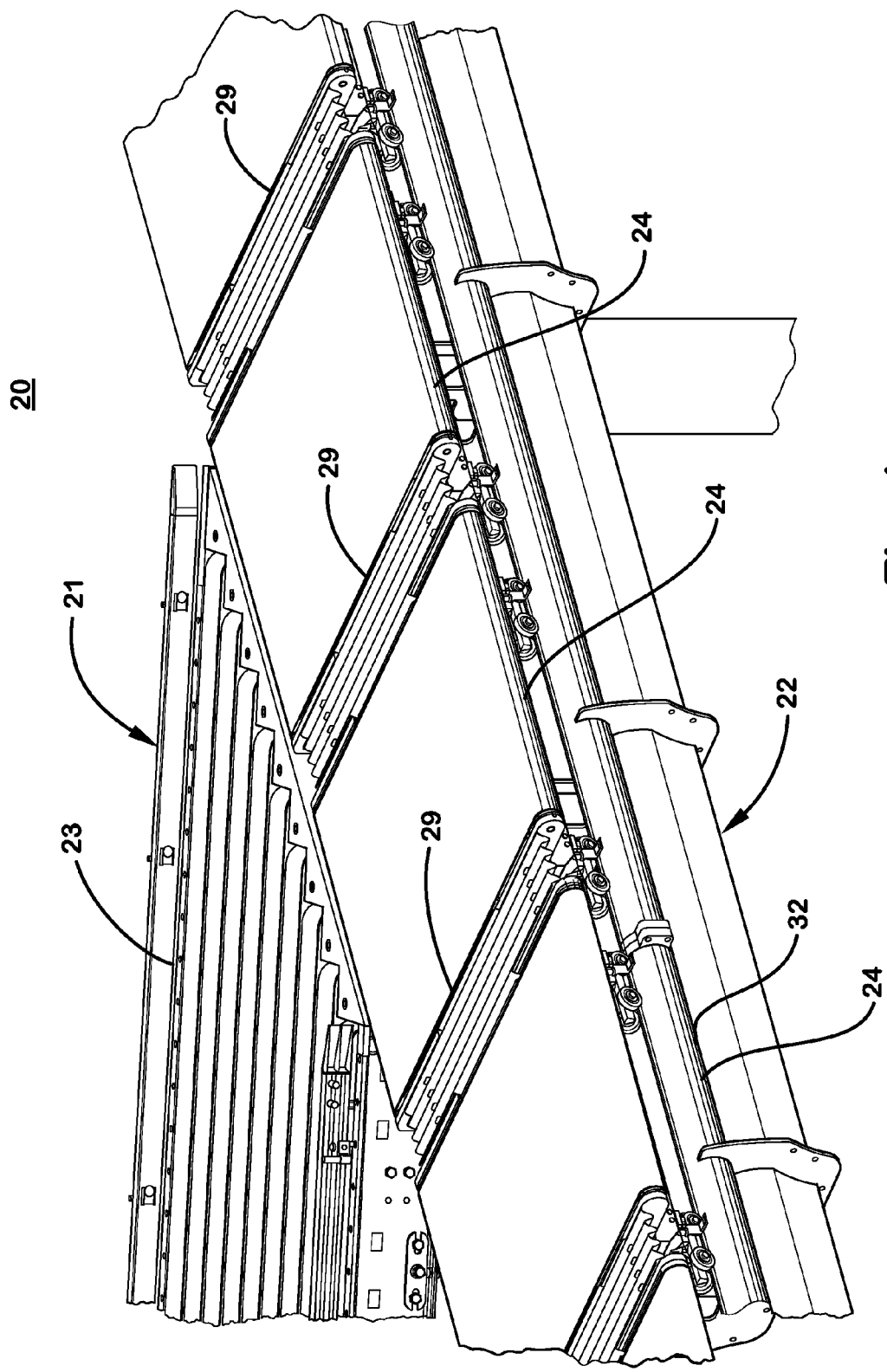
FIG. 1 is a perspective view of a crossbelt sorter system, according to an embodiment of the invention, taken from the top and a side thereof.
Figure 1A:
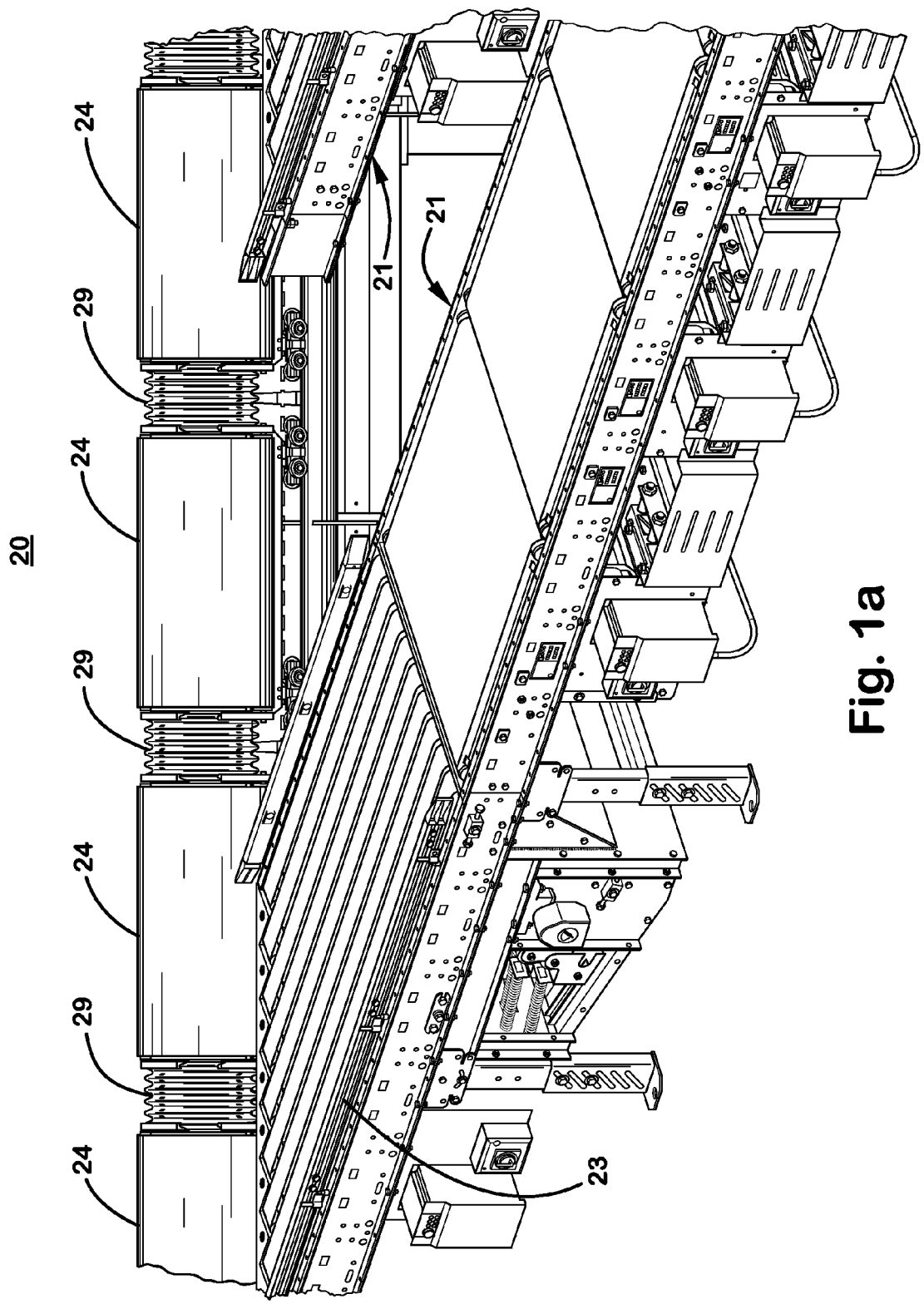
FIG. 1a is a perspective view of the crossbelt sorter shown in FIG. 1 taken from the top and an opposite side than the view in FIG. 1.
Figure 2:
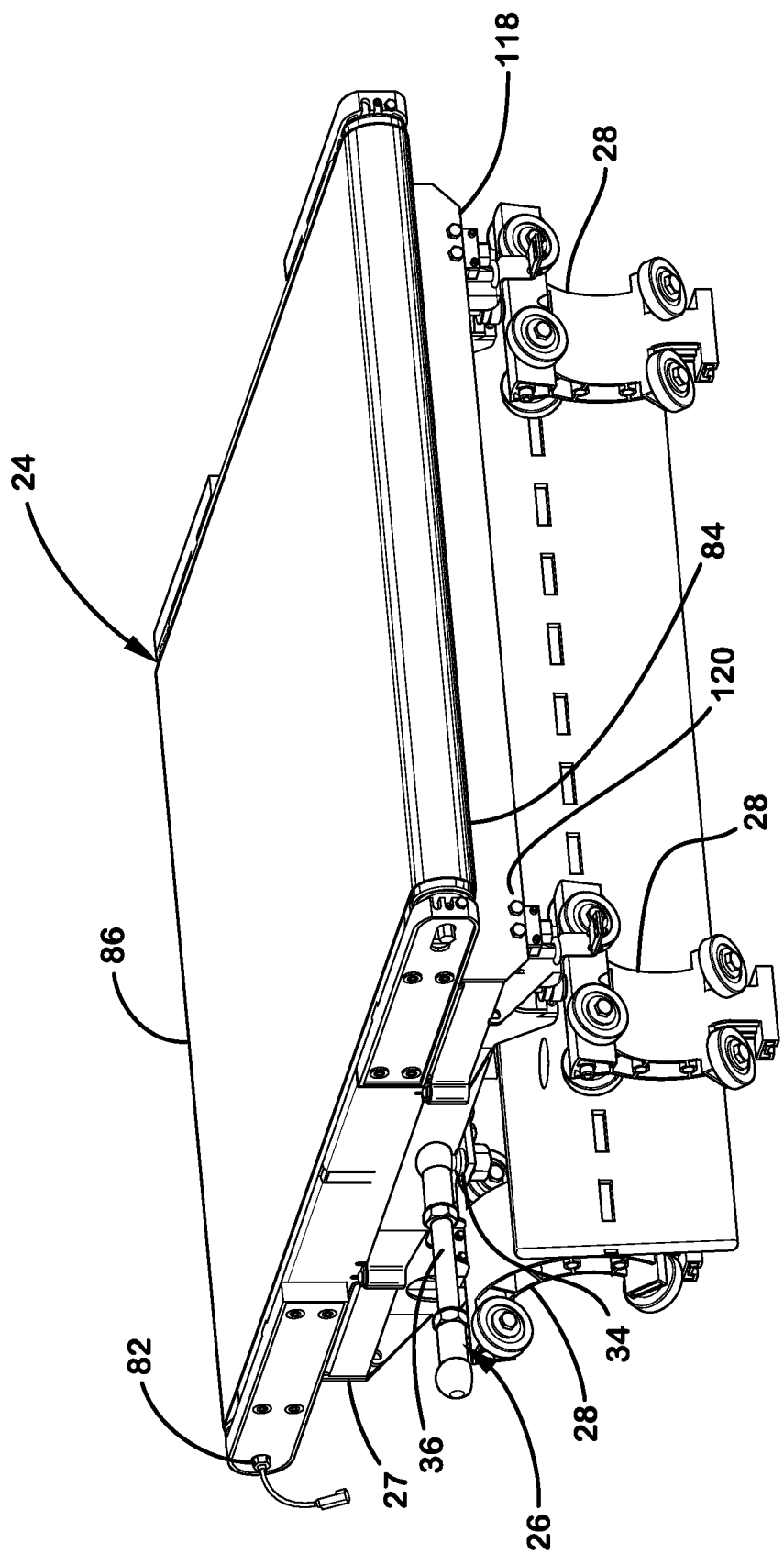
FIG. 2 is a perspective view of an individual carriage in FIG. 1 taken from the top thereof.
Figure 3:
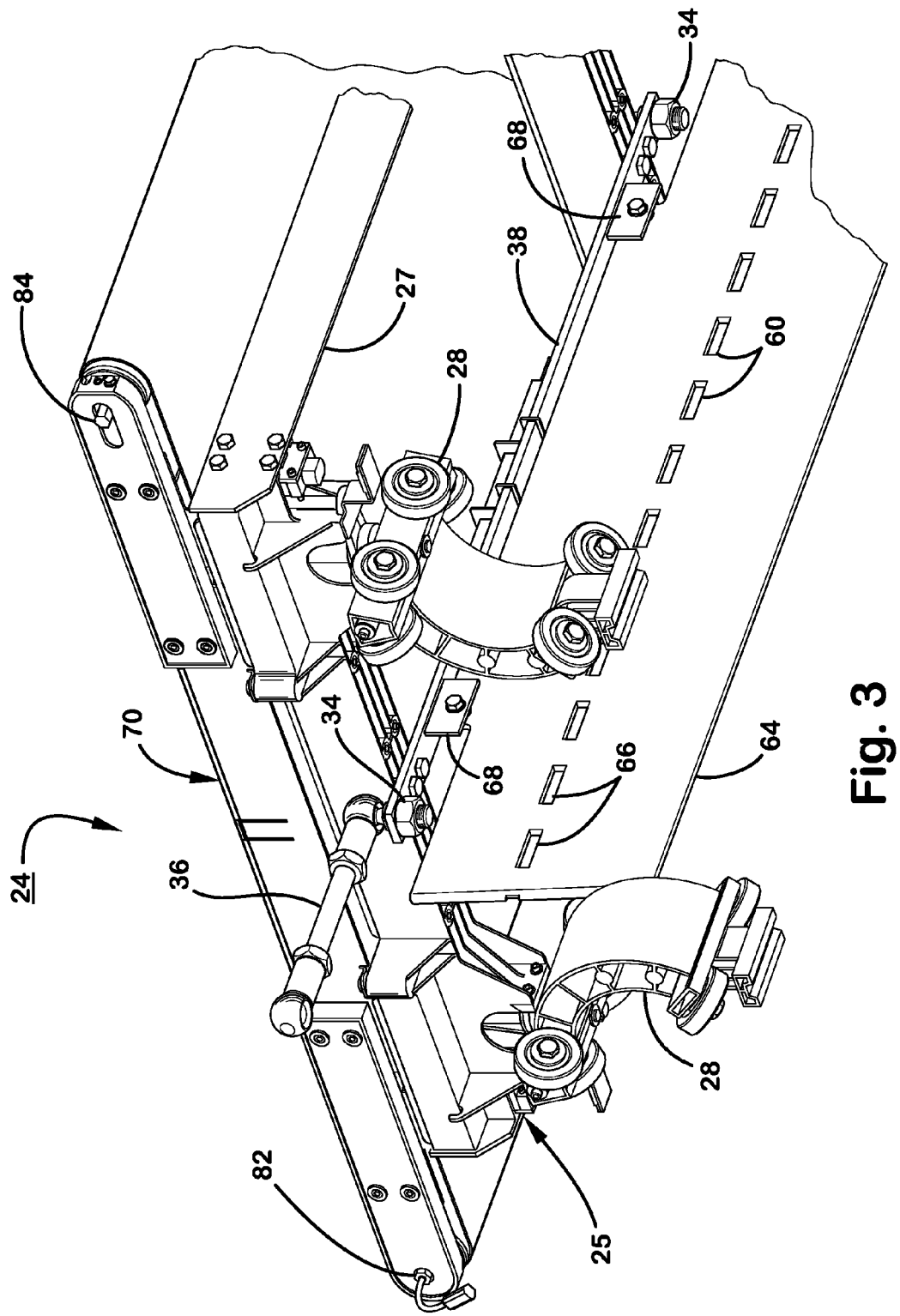
FIG. 3 is a perspective view of the carriage in FIG. 2 taken from the bottom thereof.
Figure 4:
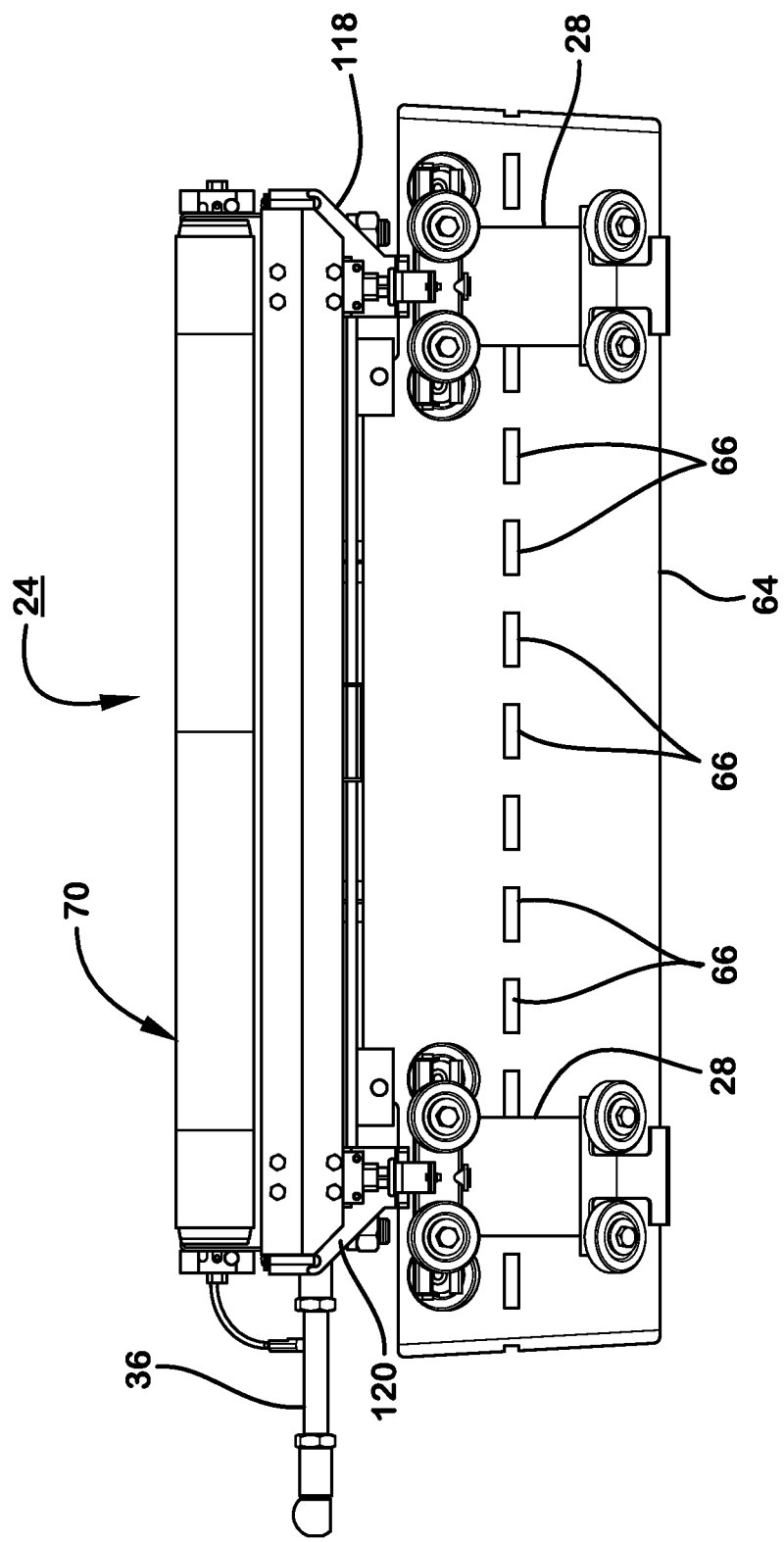
FIG. 4 is a side elevation view of the carriage in FIGS. 2 and 3.
Figure 5:
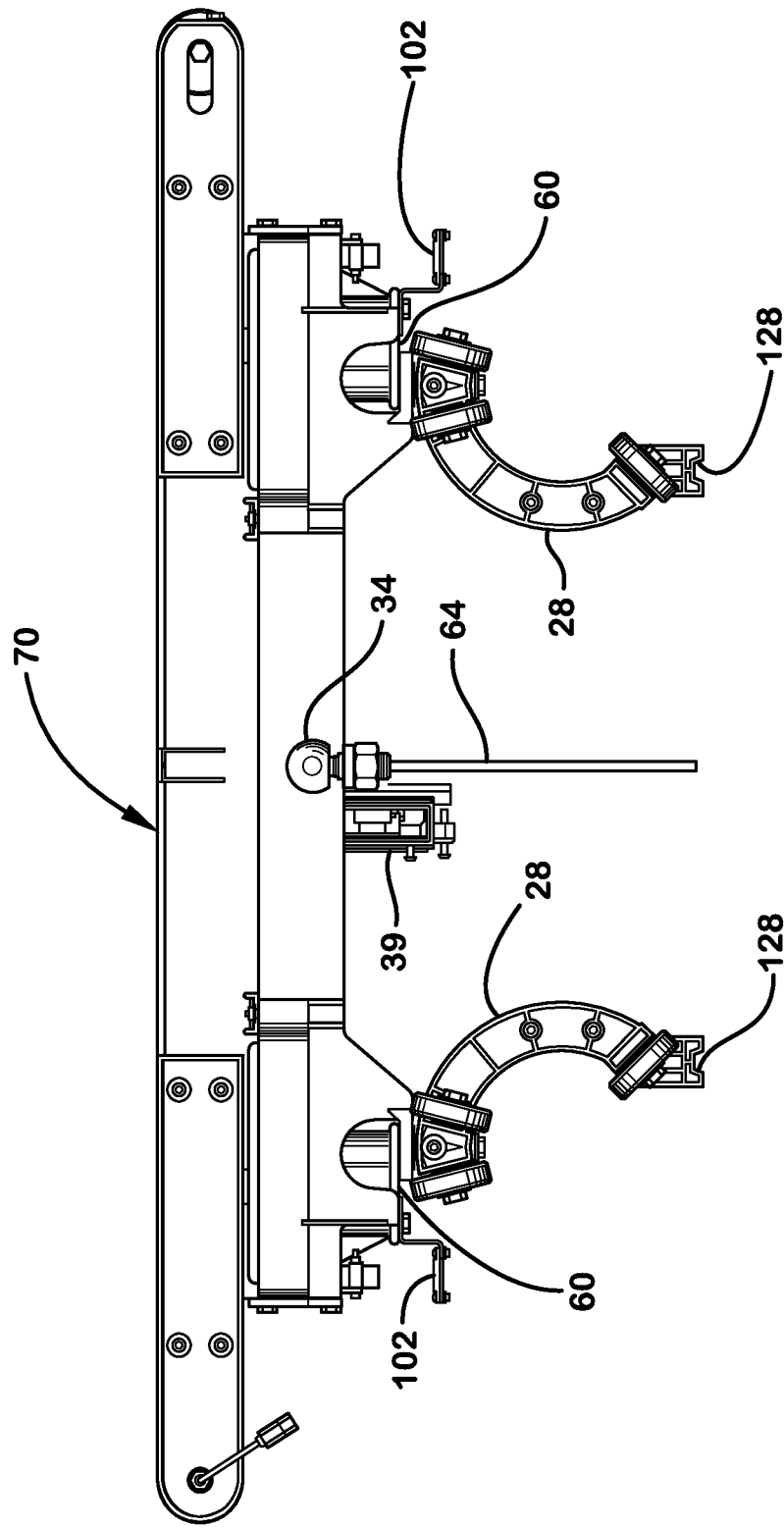
FIG. 5 is and end elevation view of the carriage in FIGS. 2 and 3.
Figure 6:
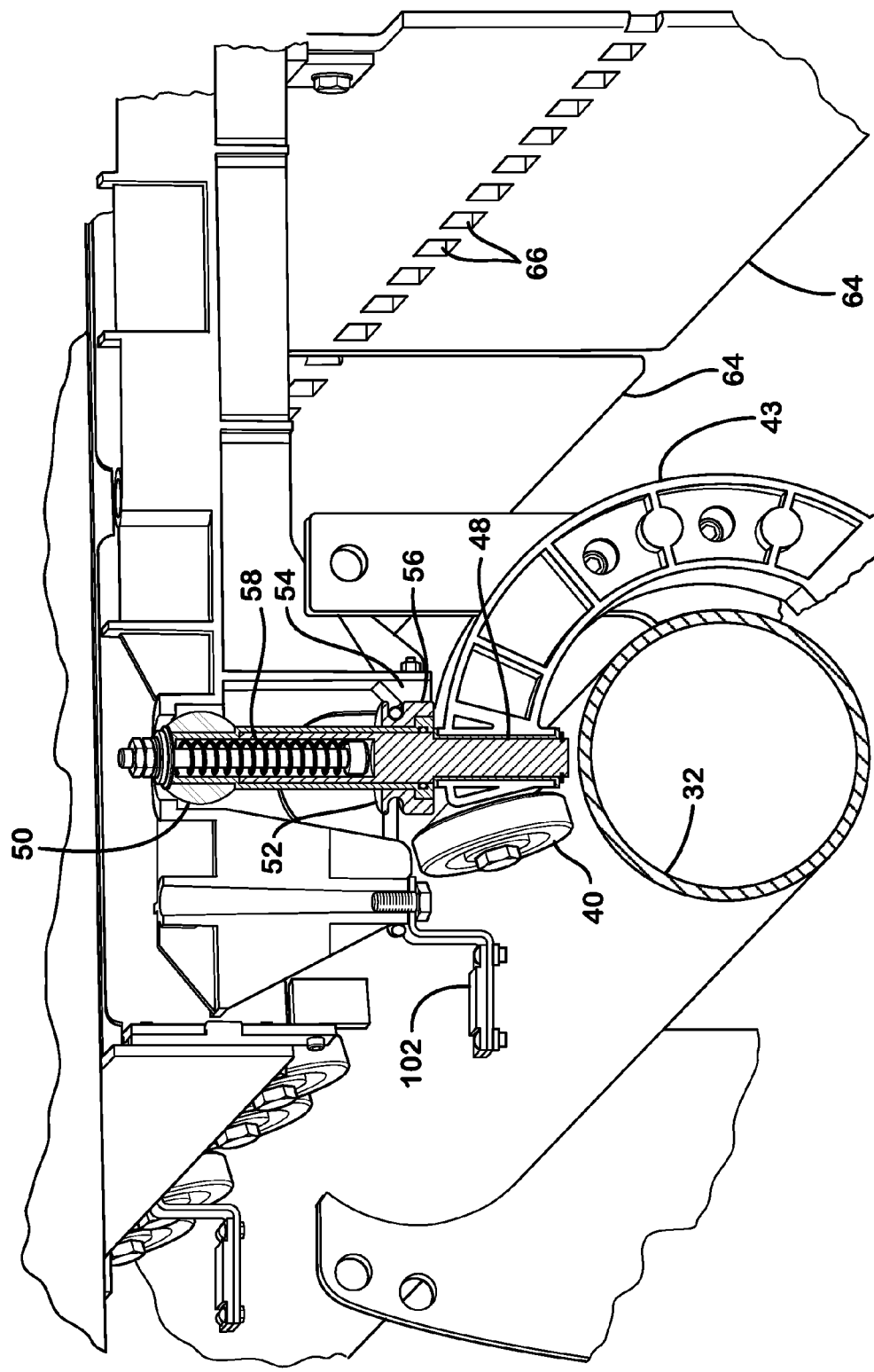
FIG. 6 is a perspective view of a trolley.
Figure 7:
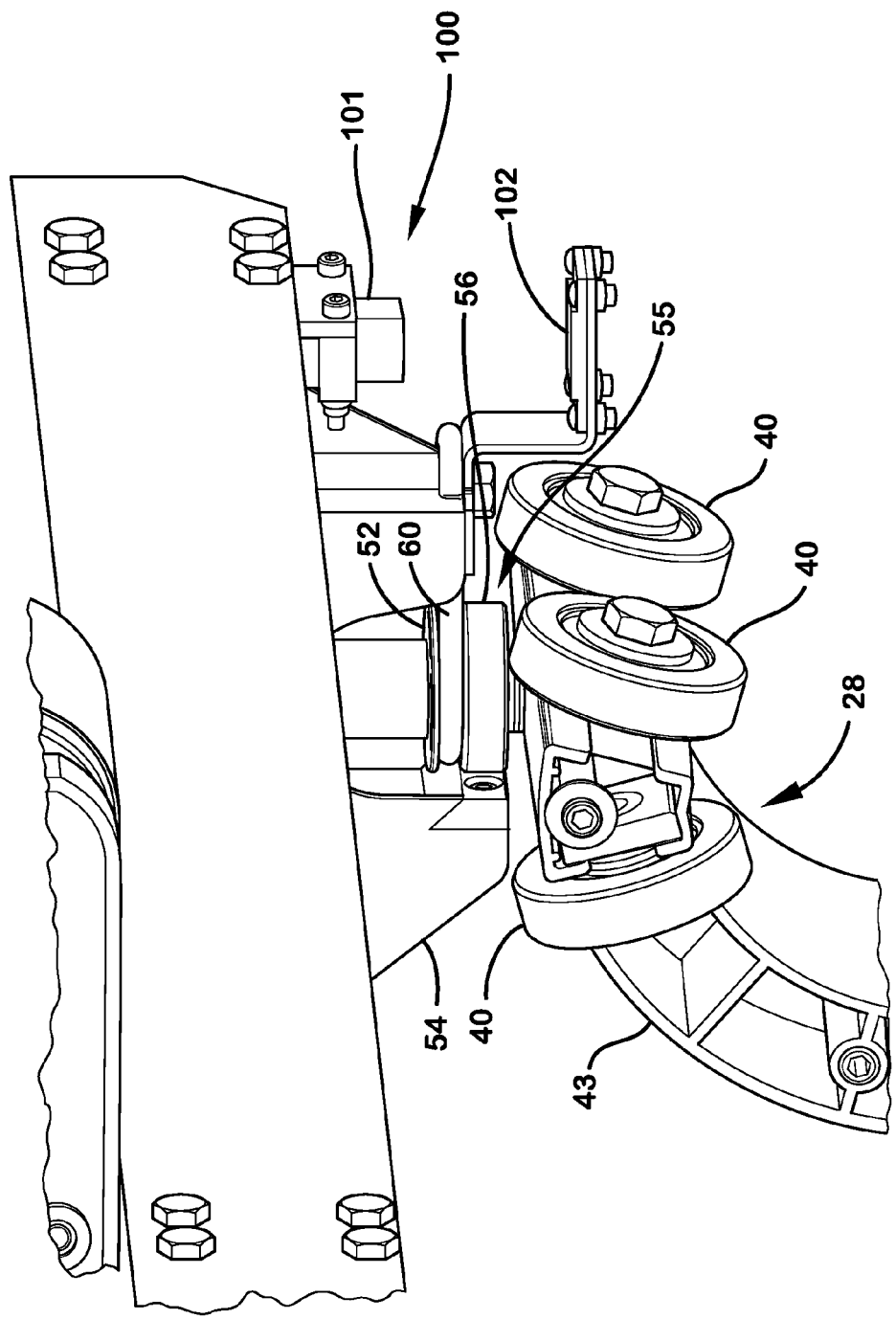
FIG. 7 is an enlarged perspective view of a portion of a trolley and a divert trigger.
Figure 8:
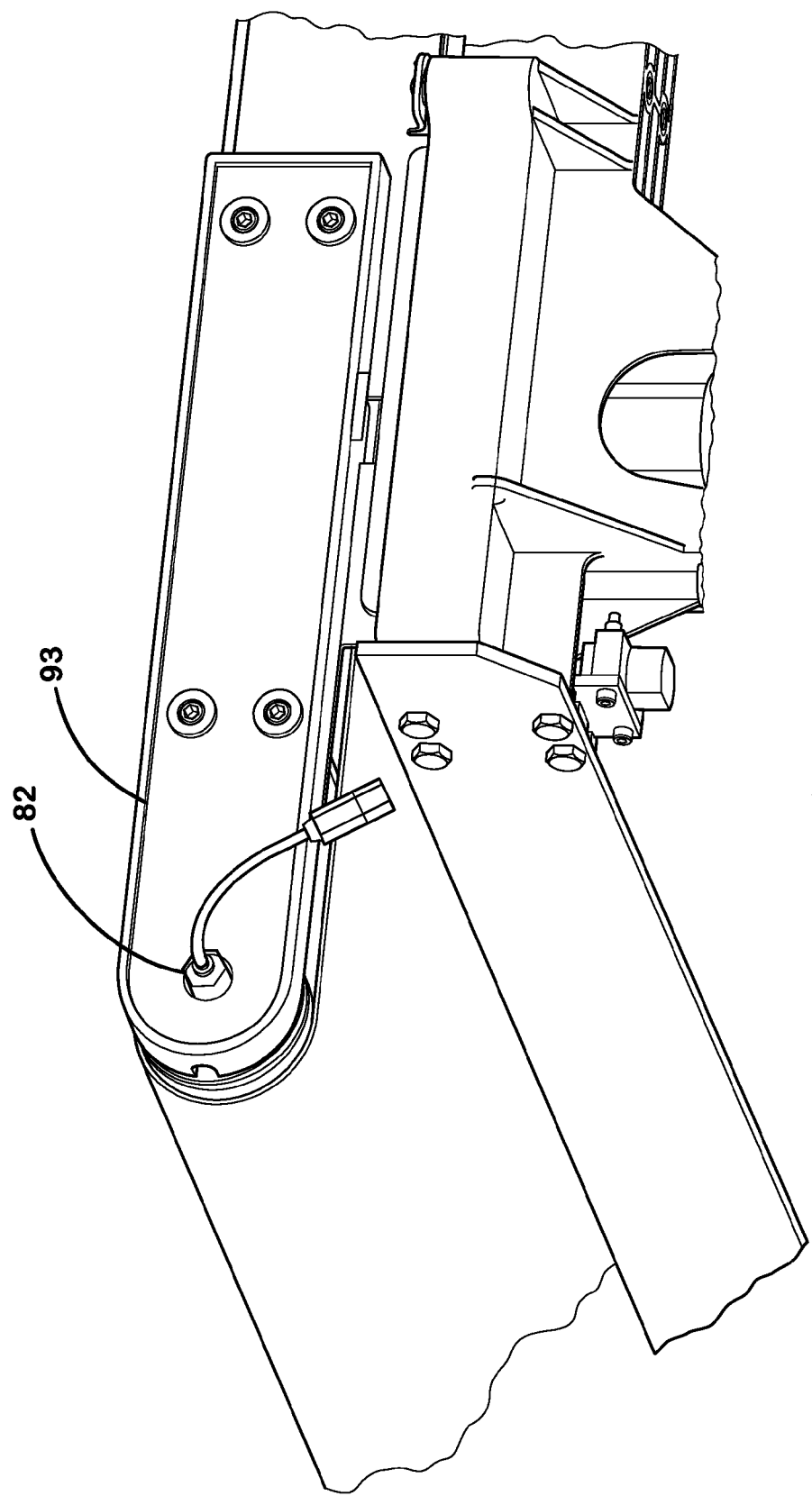
FIG. 8 is an enlarged perspective view of a portion of a carriage showing a motorized roller.
Figure 9:
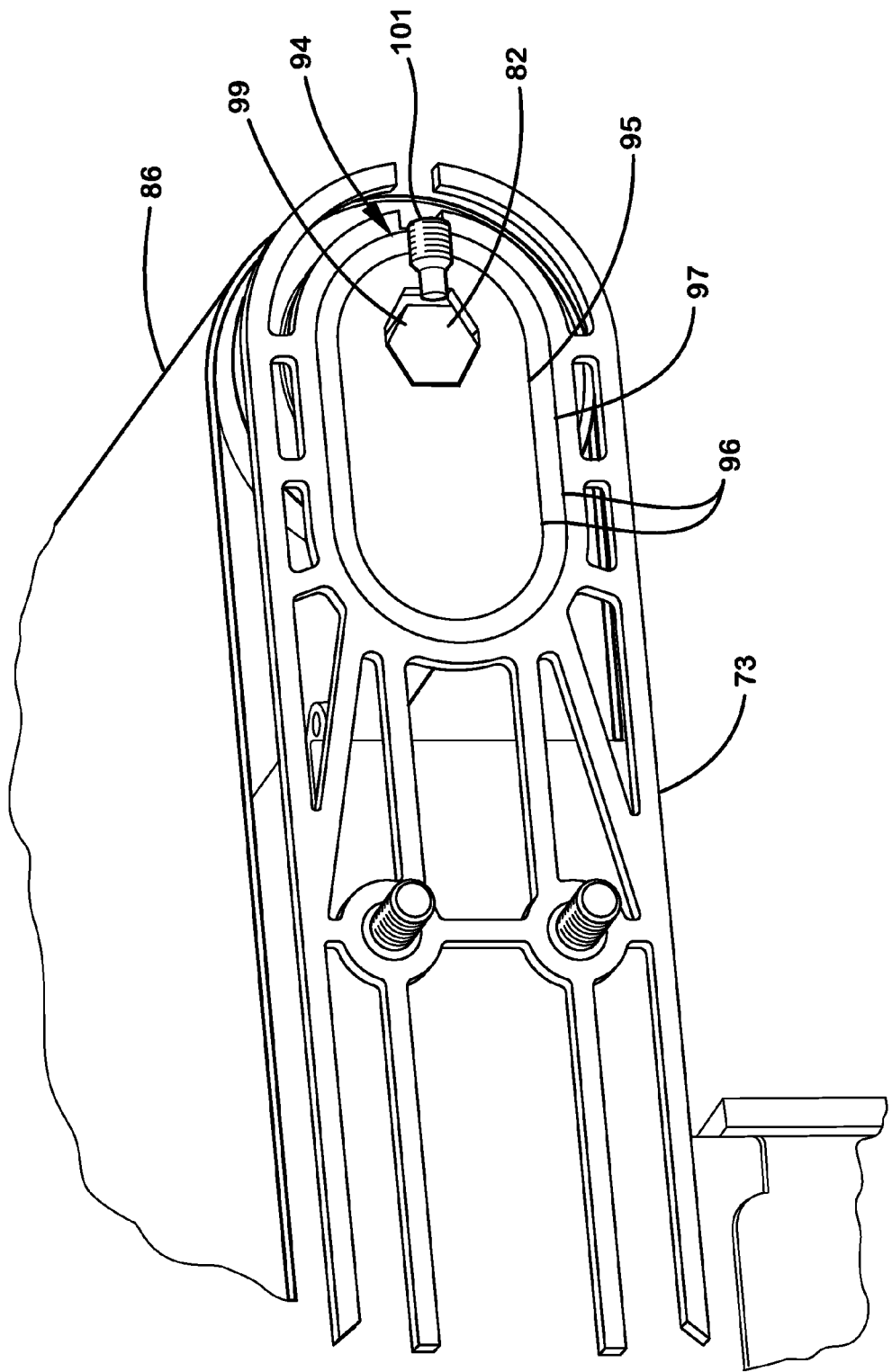
FIG. 9 is a view of the carriage having a motorized roller shown in FIG. 8 with a cover removed to reveal internal details thereof.

Referring now to the drawings and the illustrative embodiments depicted therein, a crossbelt sorter system 20 is made up of a track assembly 22 a series of carriers 24 attached to each other to travel along track assembly 22 and a propulsion system 30 that is adapted to propel carriers 24 along track assembly 22 (FIGS. 1-16). One or more induct lines 21 may be provided to supply articles to carriers 24 by coordinating operation of short belts on induct line 21 and carriers 24 using known techniques, such as disclosed in commonly assigned U.S. Pat. No. 5,588,520, the disclosure of which is hereby incorporated herein by reference. Induct lines 21, which do not form any part of the invention, may be of any conventional configuration, such as those shown in U.S. Pat. Nos. 6,513, 641; 6,918,484 and 7,121,398, the disclosures of which are hereby incorporated herein by reference. Transition beds 23, which may be of the type disclosed in commonly assigned U.S. Pat. Nos. 6,811,078; 7,093,709 and 7,556,144 B2, the disclosures of which are hereby incorporated herein by reference, feed articles from inducts 21 to carriers 24. Articles are discharged from carriers 24 at proper destinations, such as to chutes, conveyors, or the like (not shown), to effect the sort of articles.

Each carrier 24 is made up of at least a lower carriage portion 25, a trolley 28 at each of said front corner portion 118 and rear corner portions 120 of lower carriage portion 25 and including a hitch assembly 26 in the form of ball hitches 34 on adjacent carriers and connecting tongues joining adjacent carriers 24. Carriers 24 can be organized as a segmented train of carriers or as a continuous train of carriers extending in a full loop around track assembly 22. Polymeric bellows 29 engaged with adjacent carriers 24 take up the gap between adjacent carriers even during lateral curves and vertical incline and decline to avoid carried articles from slipping between the carriers.

Track assembly 22 is made up of two spaced apart rails 32 that are made substantially from a particular material, such as a suitable grade of steel, supported at design spacing by support brackets 33. Support brackets 33 have outer arms 33a to support rails 32 and inner arms 33b to support various other items, such as propulsion systems, and the like. V-shaped opening patterns 35 selectively mate with a similar pattern on support pillars (not shown) in order to provide adjustable support height for rails 32. End caps or plates 37 at transitions between sections of rails 32 have dowel and holes to align sections of rails to avoid noise and wear that could result from misaligned rails.

Each lower carriage portion 25 includes a connection member in the form of a central strut 38 that extends between ball hitches at opposite ends of that carriage 24. With connection tongues 36 and central struts 38 being made substantially from the same material as rails 32, the thermal expansion and contraction of carriers 24 matches that of the thermal expansion and contraction of track assembly 22. In this manner, the train of carriers 24 maintains the same distance as that of track assembly 22.

Track assembly 22 is made up of two spaced apart rails 32 that have a surface shape that is at least partially circular in cross section and in the illustrated embodiment is entirely circular in cross section. Each trolley 28 is made up of a bogie 44 having at least two pairs of V-oriented upper wheels 40 at an upper portion of trolley bogies 44. More particularly, upper wheels 40 are each mounted on a plane that intersects the plane of the other of the pair of upper wheels 40. This "V" shape makes each pair of upper wheels 40 self centering on the respective rail 32. One or more lower wheels 42 are provided on bogie 44 below upper wheels 40 in order to provide a force other than gravity tending to maintain upper wheels 40 in contact with rails 32.

In order to propel carriers 24, crossbelt sorter system 20 includes a propulsion system 30. In the illustrated embodiment, propulsion system 30 includes drive fin 64 on each carrier 24 that is propelled by a prime mover to propel the carriers. Drive fin 64 is attached to the corresponding central strut 38. Drive fin 64 is made of a metal, such as aluminum, in the illustrated embodiment and can be driven by a prime mover, such as an electrical drive in the form of linear motors (not shown) at various locations around track assembly 22. In such an electrical propulsion system, drive fins 64 act as a reaction member in a linear induction motor scheme that reacts to the magnetic field established by the linear motors as would be understood by the skilled artisan. In the illustrated embodiment, propulsion system 30 uses mechanical coupling to drive fins 64 frictionally to propel carriers 24. In particular, drive fins 64 are driven by one or more drive assemblies 110, each having an electric drive motor 114, which is coupled to fins 64 through a gear box 116 which transmits the output of drive motor 114 to a drive roller 111. A pinch roller 112 presses each drive fin 64 against drive roller 111, but is not driven itself. This greatly simplifies the structure of each drive assembly, but provides adequate frictional coupling between each drive assembly 110 and drive fins 64. Drive assemblies 110 can be distributed along track assembly 22 at desirable spacing, such as every 30 feet, or the like.

Each drive fin 64 may be made from material having a thermal expansion and contraction characteristics that are different from the expansion and contraction characteristics of central strut 38 and track assembly 22. This allows drive fin 64 to be made of a material that is selected for its superior drive capability, such as electrical and weight characteristics. In order to accommodate such difference in thermal expansion and contraction characteristics, drive fin 64 is attached to central strut 38 with a flexible mount, such as a slip joint 68 which allows relative movement between drive fin 64 and central strut 38 while holding drive fin 64 firmly in place. Also, each drive fin 64 defines a series of encoder openings 66 which interact with a photo-sensor (not shown) in order to track position and movement of each carrier 24. Also, each drive fin 64 includes a chamfered leading and/or trailing edge in order to enhance alignment of the fin with drive roller 111 and pinch roller 112.

Each carrier 24 has front corners 118 and rear corners 120. A trolley 28 is provided at each front corner portion 118 and rear corner portion 120 to moveably support each carrier. A hitch assembly 26 joins adjacent carriers 24. This allows the lower carriage portion 25 to be lighter in weight because it is supported at four (4) corners rather than in a cantilevered manner. Also, each carrier 24 can be individually mounted to track assembly 22 and subsequently be coupled to adjacent carriers.

Figure 11:
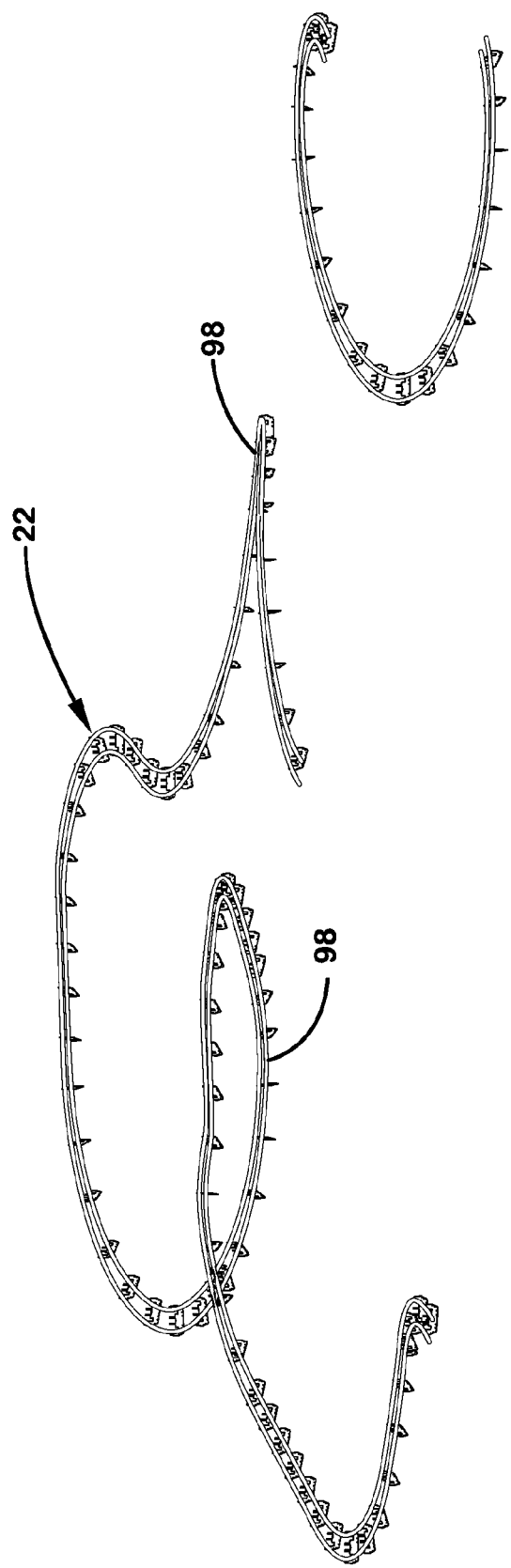
FIG. 11 is a perspective view of an exemplary track layout.
Figure 12:
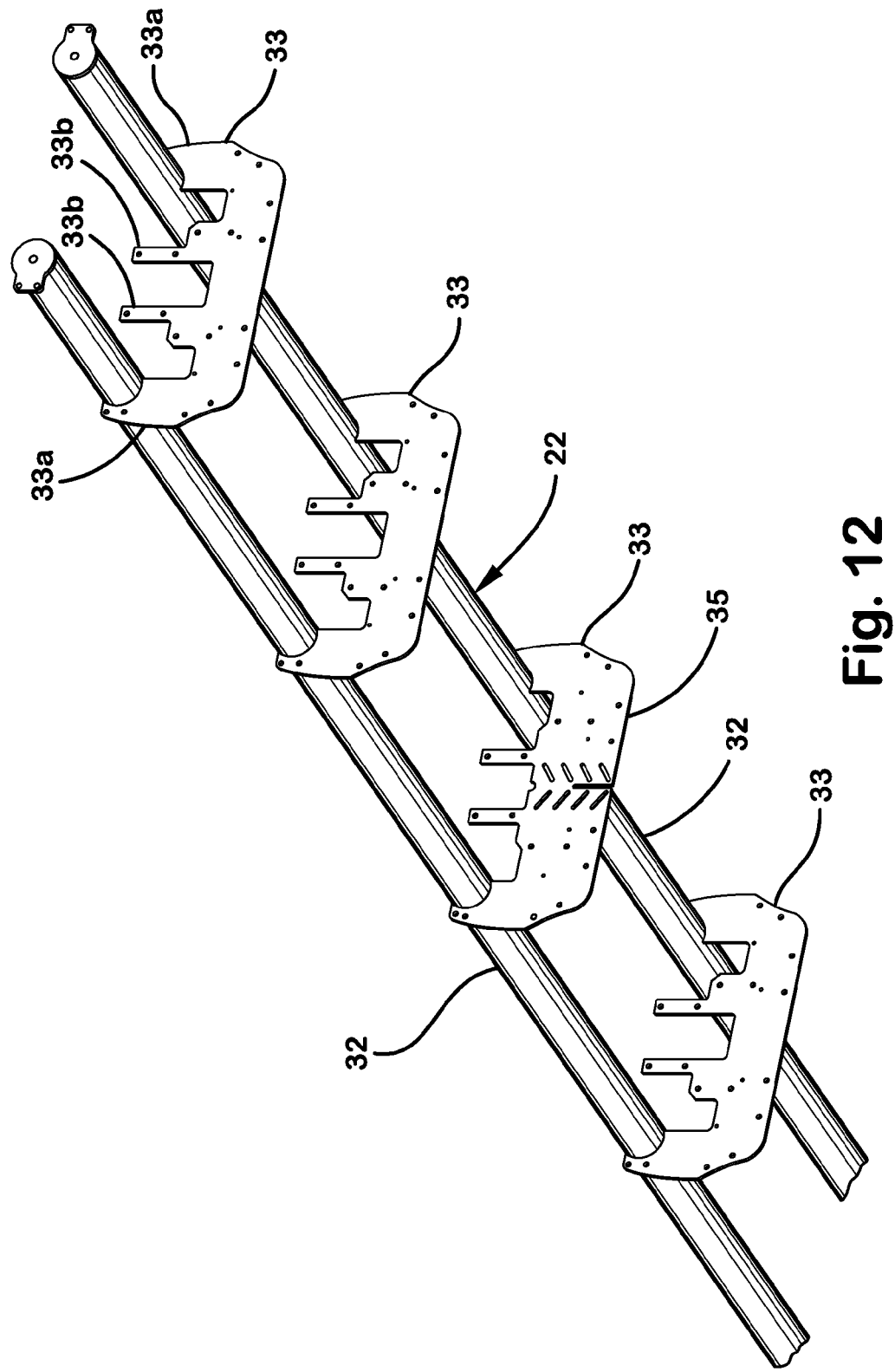
FIG. 12 is a perspective view taken from below a portion of the track assembly.
Figure 13:
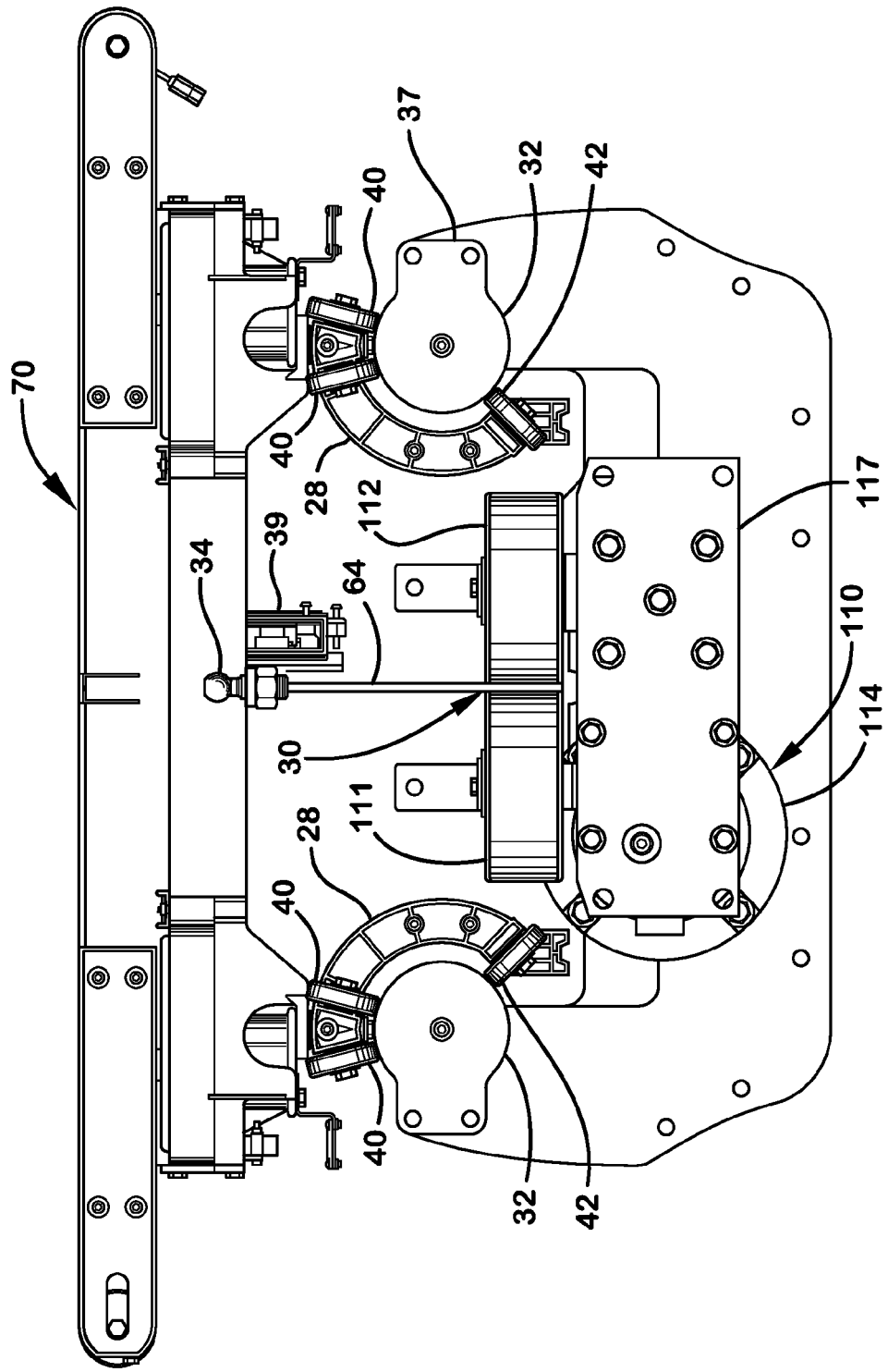
FIG. 13 is an end elevation of a drive mechanism illustrated with a mechanical prime mover.
Figure 16:
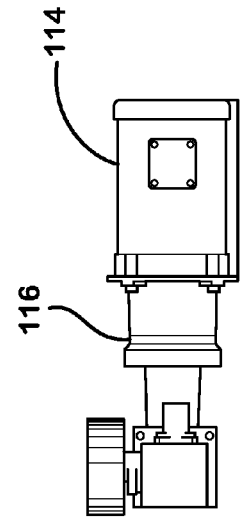
FIG. 16 is a side elevation of the mechanical prime mover in FIG. 14.
Figure 15:
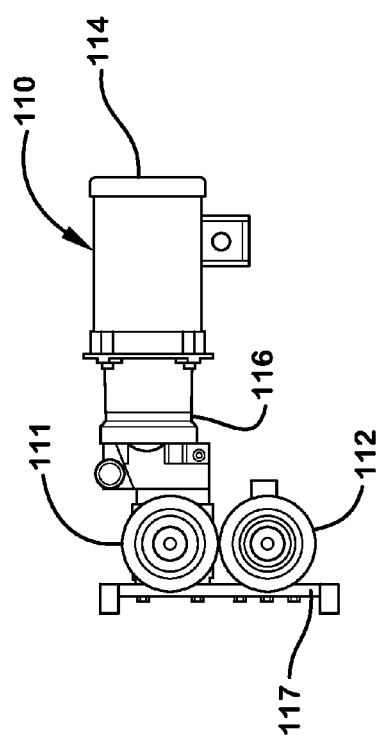
FIG. 15 is a top plan view of the mechanical prime mover in FIG. 14.
Figure 14:
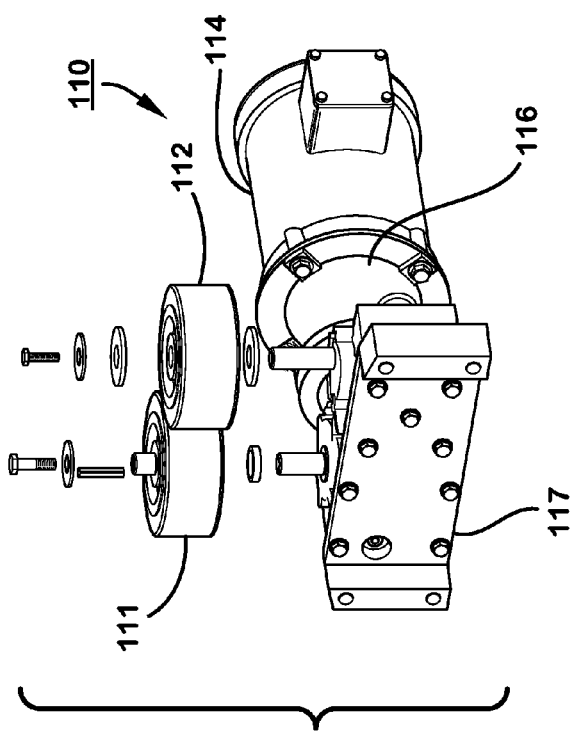
FIG. 14 is a perspective view of the mechanical prime mover in FIG. 13.
Figure 17:
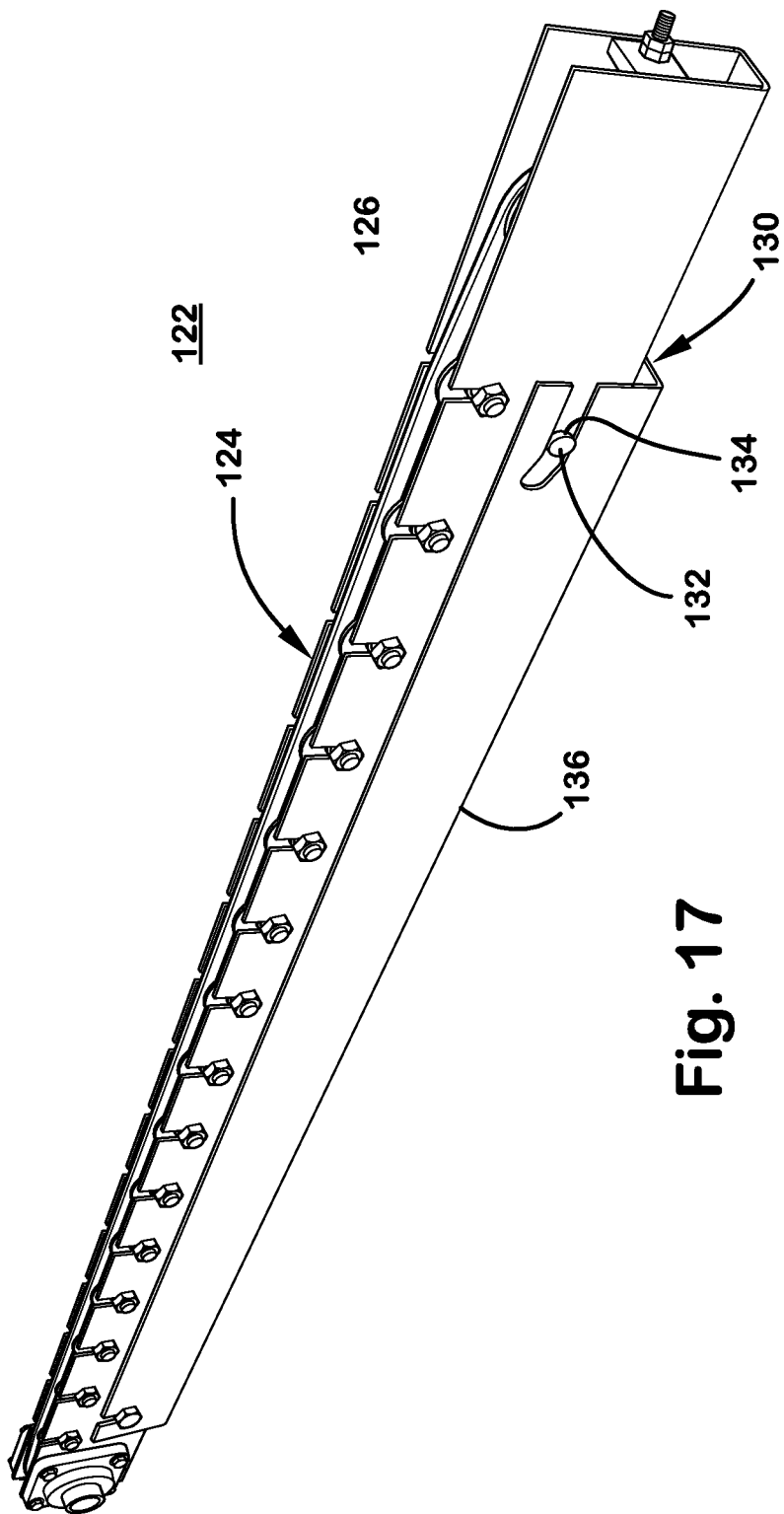
FIG. 17 is a perspective view of an alternative mechanical prime mover.
Figure 18:
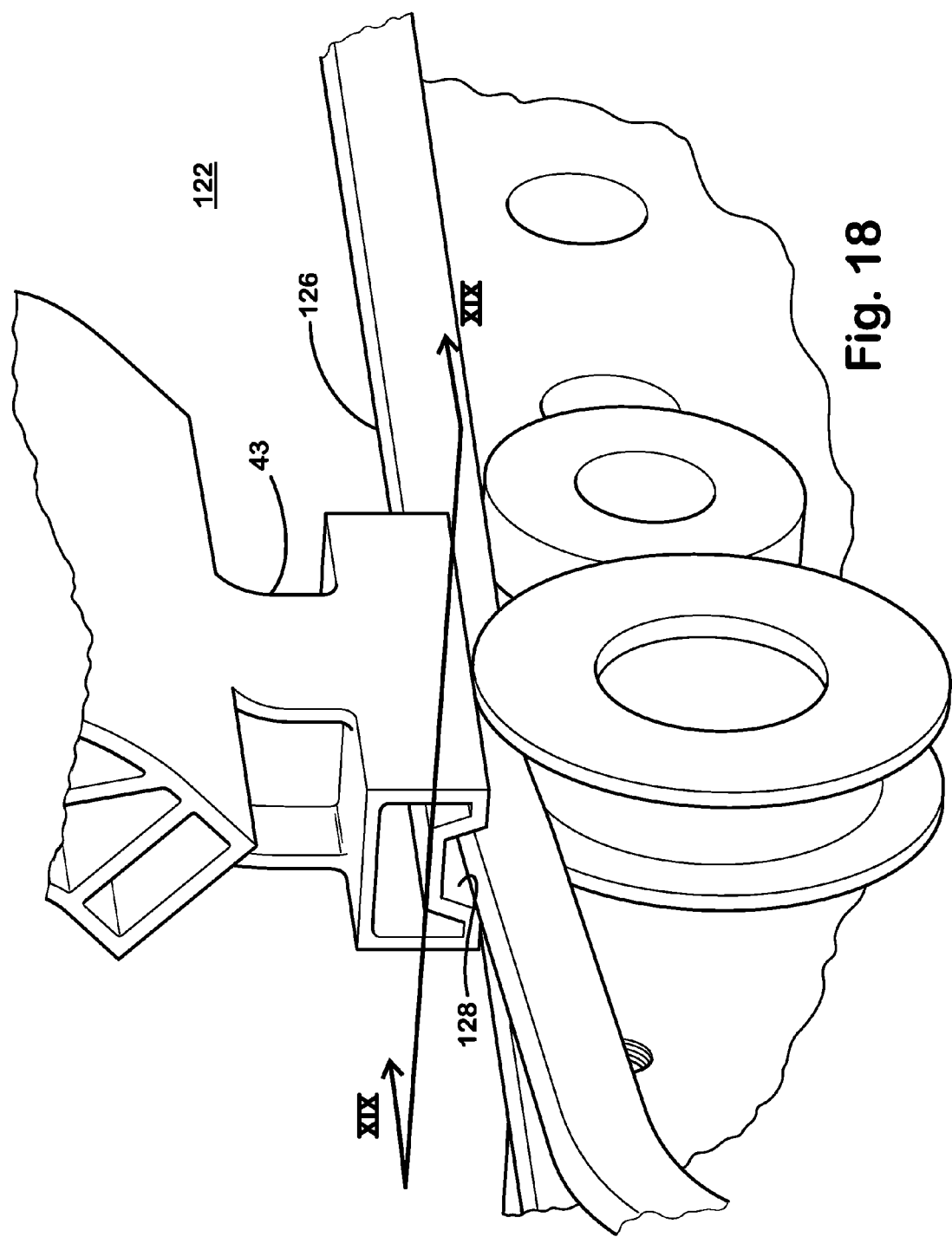
FIG. 18 is a perspective view illustrating engagement of the prime mover in FIG. 17 with a trolley.
Figure 19:
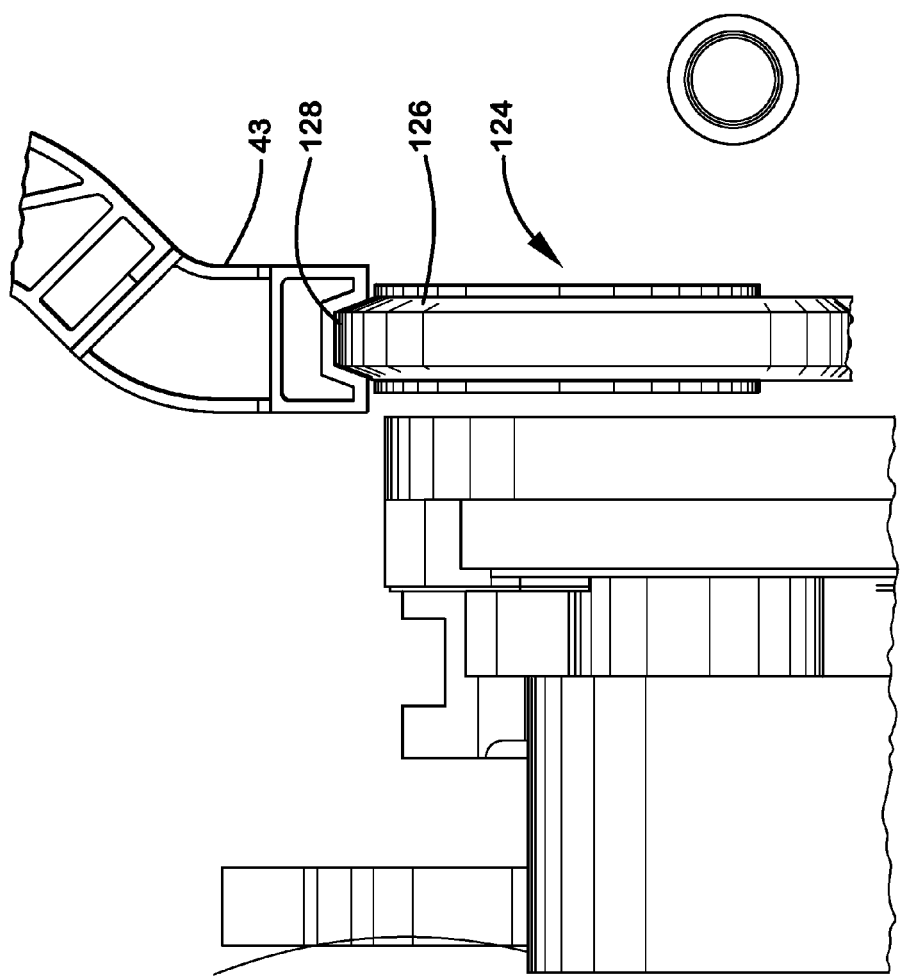
FIG. 19 is an end elevation taken in the direction XIX-XIX in FIG. 18.

Each trolley 28 is mounted to the associated carrier 24 in a manner that bogie 44 can pivot in at least two different directions, such as fore/aft and side-to-side. This structure allows track assembly 22 to have both side-to-side curves and vertical curves at the same location. Thus, track assembly 22 can have spiral portions 98 thereof, as best seen in FIG. 11, because each trolley 28 can pivot in said at least two different directions to support the associated carrier 24 as it moves in one of the spiral portions 98 of track assembly 22 and can accommodate vertical loading applied to the trolley. The vertical loading is absorbed by biasing member 58. The ability to accommodate vertical loading is important to the ability to travel on a spiral track portion because no more than three or four trolleys will be on a common plane at any given moment in time. The ability of biasing member 58 to absorb vertical loading allows the fourth trolley to adjust to a different plane. By facilitating spiral portions 98 of track assembly 22, track assembly 22 can be made more compact for a given footprint, as would be understood by the skilled artisan.

Each trolley 28 is mounted to lower carriage portion 25 with a spherical bearing to define a circular pivot 50 in order to allow each trolley to pivot in the at least two different directions, such as fore/aft and side-to-side. Circular pivot 50 is provided in the illustrated embodiment by a spherical bushing known as an "Igu Ball" supplied by the Igus Company. Each trolley 28 includes a lateral biasing member, such as an O-ring, 60 that is adapted to bias that trolley 28 into lateral engagement with track assembly 22. Motion of the trolley about spherical bearing 50 is further limited in order to prevent each trolley 28 from disengaging with track assembly 22. Motion is limited by a cylinder 52 that normally engages a strike plate 54 when the trolley exceeds a certain amount of angular motion with respect to spherical bearing 50. However, an override 55 is provided that is actuated by biasing member 60 being disabled or stretched, such that the associated trolley 28 can be removed from track assembly 22. Biasing member 60 maintains cylinder 52 in the vertical proximity to strike plate 54. However, override 55 allows the travel limit imposed by cylinder 52 moving within the confines of strike plate 54 to be bypassed. Lock collar 56 and strike plate 54 are arranged to engage each other under operating conditions to limit movement of trolley 28 as it rotates about circular pivot 50 in the two or more different directions so that carriers 24 do not separate from track assembly 22. This is accomplished by lock collar 56 being attached to shaft 48 for movement with spherical bearing 50 and strike plate 54 being mounted to the carrier, or vice versa. Override 55 is defined by lock collar 56 and strike plate 54 being mounted in a manner to be vertically separable from each other. When override 55 has been activated, the corresponding trolley 28 can be swung away from track assembly 22 so that the corresponding carrier can be lifted from track assembly 22. Override 55 is formed by the ability to displace lock collar 56 from the same general vertical position as strike plate 54. In order to activate override 55, lateral biasing member 60 is stretched or removed so that lock collar 56 can travel vertically along shaft 48 so that locking collar 56 no longer is vertically aligned with strike plate 54. Bogie 43 can then be swung inwardly away from track assembly 22 under the guidance of circular pivot 50.

Bogie 44 is made up of six (6) wheels, four at the top arranged as two V-arranged pair of wheels 40 and two single wheels 42 at the bottom. Each of the V-arranged pair of wheels 40 at the top tend to align with rail 32 under the force of gravity acting on carriers 24. There are two pair of upper wheels 40 to provide greater distribution of the load and to align the bogie with the longitudinal layout of track assembly 22. Lower wheels 42 engage rail 32 opposite from upper wheels 40 to tend to hold upper wheels 40 in engagement with track assembly 22, especially at vertical and/or horizontal curves in track assembly 22. Wheels 40, 42 are mounted to each other through a bracket 43 that may be made from a polymer in order to reduce the weight of the carrier 24 while reducing material and labor cost. Of course, bracket 43 could also be made of cast aluminum or other material. Wheels 40, 42 could also be made from a polymer tread on a steel bearing in order to minimize noise from travelling along rails 32 and reduce cost.

Each carrier 24 may be a two-piece design made up of a lower carriage portion 25 and an upper carriage portion 70 attached to the lower carriage portions of adjacent ones of carriages 24. Lower carriage portion 25 includes hitch assembly 26 and central strut 38, along with driving fin 64 if one is used as a part of the propulsion system. A frame structure 24 is supported by central strut 38 and, in turn, mounts trolleys 28 at each of the forward and rear corners 118, 120 thereof. Upper carriage portion 70 includes an upper frame 73 to which is mounted a driven roller, such as a motorized roller 82 and another, idler, roller 84. A conveyor belt 86 is reeved about rollers 82, 84. In this manner, upper carriage portion 70 may be removed in order to replace conveyor belt 86 using the principles disclosed in commonly assigned U.S. Pat. No. 7,806,254 B2 entitled Belt Conveyor and Method, the disclosure of which is hereby incorporated herein by reference. Also, a spare upper carriage portion 70 may be kept as a spare part to allow a carriage to be quickly repaired and put back into service if maintenance is required. Also, carriers can travel about track assembly 22 with only lower carriage portions 25.

Figure 10:
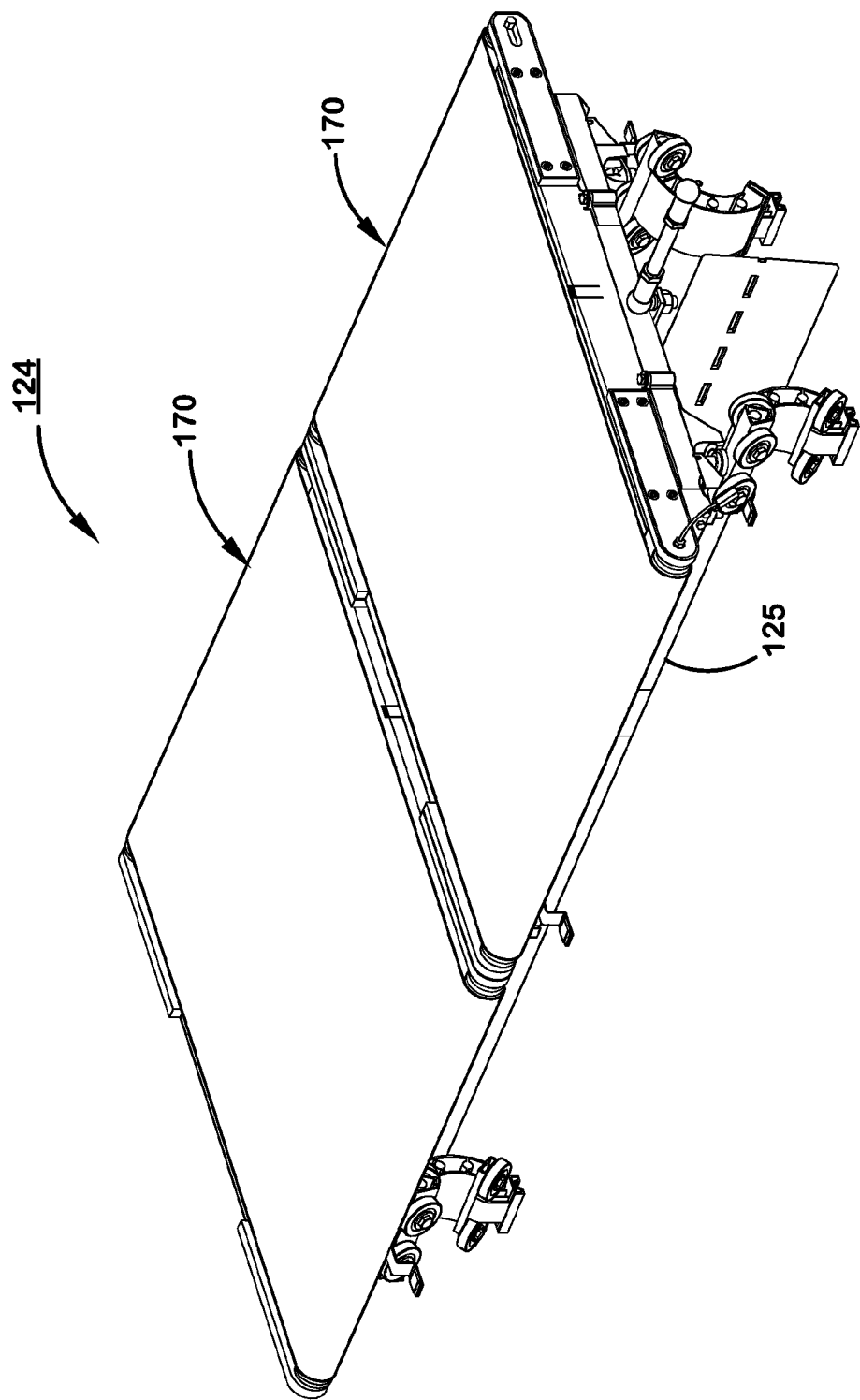
FIG. 10 is a perspective view of an alternative embodiment of an individual carriage.

In an alternative embodiment, a carrier 124 has two or more upper carriage portions 170 that may be supported by a common lower carriage portion 125, as illustrated in FIG. 10. Upper carrier portions 170 may be controlled, such as in a master/slave arrangement, from a common electronic control module 39 of the type disclosed in U.S. Pat. No. 7,360,638 B2, the disclosure of which is hereby incorporated herein by reference. Conveyor belt 86 may have a low modulus of elasticity, as disclosed in commonly assigned U.S. Pat. Nos. 6,811,018; 7,093,709 and 7,556,144 B2 entitled Belt Conveyor, the disclosures of which are hereby incorporated herein by reference. This allows conveyor belt 86 to be tensioned and tracked without a take-up assembly.

Motorized roller 82 is mounted to upper frame 73 in the illustrated embodiment by a mount 94. Mount 94 includes a clamp 95 that engages an axle 99 of roller 82 using a setscrew 101. A self-reinforcing cushion 97 both retains clamp 95 to frame 73 and provides flexibility that reduces transmission of vibration between frame 73 and roller 82. In the illustrated embodiment, each cushion 97 is defined by a polymeric sleeve, such as an O-ring supporting an end of said motorized roller that is captured by clamp 95. Both clamp 95 and the engaging portion of frame 73 have engagement grooves 96 therein in order to retain cushion 97 in position while providing separation between clamp 95 and frame 73 to reduce transmission of vibration. A cover 93 may by positioned over axle 99 and clamp 95. Idler roller 84 may be mounted using conventional mounting hardware.

A divert trigger 100 may be provided to prompt conveyor belt 86 to discharge a load thereon to a particular location along track assembly 22. Divert trigger 100 may be in the form of a photo eye 101 and a reflector 102 on either the carrier 24 or at the track assembly 22 at the discharge location. A stationary flag (not shown) selectively interrupts a photo beam from photo eye 101 if the photo eye is on the carrier. The flag is positioned to selectively block the photo beam from photo eye 101 to prompt conveyor belt 86 to discharge a load thereon. Thus, divert trigger 100 provides timing for discharging of an article at a precise moment to arrive at the proper location of the discharge conveyor, chute, or the like.

In order to identify the desired discharge location, the flag may be a stationary member that passes between photo eye 101 and reflector 102 and is selectively opaque, such as by a system controller. The flag may be a switchable liquid crystal device that is operated by the system controller, or the like. Of course, the flag could be mounted to the carrier and photo eye 101 and reflector 102 be stationary.

Propulsion system 30 for propelling linked carriers 24 along track assembly 22 in an embodiment includes one or more drive assemblies 110 distributed along track assembly 22 in order to mechanically propel driving fins 64. Each drive assembly 110 includes a drive roller 111 and a pinch roller 112 that presses the fin against drive roller 111. Each drive roller 111 is rotated by an electric motor 114, such as a variable frequency variable speed drive through a gear box 116 that decreases the gearing ratio between motor 114 and drive roller 111. Pinch roller 112 is a freely rotatable roller. Alternatively, driving fins 64 may be propelled by linear motors with fins 64 being propelled by fields established by the linear motors, as is understood by the skilled artisan.

In some applications, the crossbelt sorter system may include one or more horizontal or vertical curves in track assembly 22 that are too small in radius to accommodate driving fins 64. In such application, an alternative propulsion system 122 may be used. Propulsion system 112 extends along a portion of track assembly 22 and engages some or all of bogies 44 or trolleys 28 to propel carriers 24. Because trolleys 28 are free to rotate and pivot in lateral and longitudinal directions, they can accommodate tight turns. Propulsion system 122 includes at least one and preferably at least two drive assemblies 124, each having a driven travelling member 126, such as endless belts, extending along a portion of one of rails 32. Driving assembly 124 is positioned at a straight section of track assembly 22. Driven travelling member 126 may be a square belt, V-belt or other suitable shape that engages grooves 128 in brackets 43 at the bottom of each bogie to propel that bogie. A force-reinforcement mounting 130 may be responsive to contact with one of said bogies 44 to increase force of contact between travelling member 126 and the contacted trolleys. In the illustrated embodiment, force-reinforcing mount 130 includes pins 132 in inclined grooves in a support 136. This tends to propel support 136 of travelling member 126 upwardly in response to resistance encountered between travelling member 126 and trolleys 28. Such force creates a rearward reactionary force on travelling member 126 and a forward reactionary force on support 136. This causes pins 132 to elevate support 136, or vice versa, and, hence, travelling member 126 to increase the vertical force of travelling member 126 and, hence, the friction with bogies 44.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A crossbelt sorter system, comprising:
a track assembly;

a plurality of carriers attached to each other to travel along said track assembly, each of said carriers having a plurality of trolleys, wherein each of said trolleys comprises at least one wheel and a bogie bracket mounting at least one wheel, wherein said bogie bracket of each of said trolleys is mounted to the associated one of said carriers to pivot in at least two different directions wherein said track assembly comprises curves in vertical and horizontal planes at a same location thereof and wherein said bogie bracket of at least one of said trolleys is adapted to move with respect to the carrier in a third direction perpendicular to said at least two different directions in addition to being mounted to pivot in said at least two different directions to support the associated said carriers as it moves through said vertical and horizontal planes; and a propulsion system that is adapted to propel said carriers along said track assembly.

2. The system as claimed in claim 1 including a vertical biasing member to bias said at least one of said trolleys against movement in said third direction perpendicular to said at least two different directions.

3. The system as claimed in claim 1 wherein each said trolley is mounted with a spherical bearing in order to pivot in said at least two different directions.

4. The system as claimed in claim 3 wherein each said trolley includes a horizontal biasing member that is adapted to bias that trolley into lateral engagement with said track assembly.

5. The system as claimed in claim 1 wherein said at least one wheel comprises a plurality of wheels.

6. The system as claimed in claim 1 wherein said bogie bracket is made substantially from a polymer.

7. The system as claimed in claim 6 wherein said wheels are made substantially from a polymer.

8. A crossbelt sorter system, comprising:
a track assembly;
a plurality of carriers attached to each other to travel along said track assembly, each of said carriers and a plurality of trolleys, wherein each of said trolleys is mounted to the associated one of said carriers to pivot in at least two different directions wherein said track assembly having curves in vertical and horizontal planes at a same location and each said trolley is adapted to pivot in said at least two different directions to support the associated said carriers as it moves through said vertical and horizontal planes; and
a propulsion system that is adapted to propel said carriers along said track assembly;
wherein each said trolley is mounted with a spherical bearing in order to pivot in said at least two different directions, wherein each said trolley includes a horizontal biasing member that is adapted to bias that trolley into lateral engagement with said track assembly, wherein each said trolley includes an override that allows said horizontal biasing member to be overridden for separation of the associated said trolley from said track assembly.

9. The system as claimed in claim 8 wherein said trolley includes a travel limit that is adapted to limiting movement of said trolley in said directions and wherein said override allows said travel limit to be bypassed.

10. The system as claimed in claim 9 wherein said travel limit comprises a lock collar and a strike plate that are adapted to engage each other to limit movement of said trolley in said directions, one of said lock collar and said strike plate being mounted for movement with said spherical bearing and the other of said lock collar and said strike plate mounted to the associated one of said carriages and wherein said override allows said lock collar and said strike plate to be separated from each other.

11. A crossbelt sorter system, comprising:
a track assembly;
a plurality of carriers attached to each other to travel along said track assembly, each of said carriers comprising at least front and rear corner portions thereof, a trolley at at least one chosen from said front corner portion and said rear corner portion, said trolley is configured to travel along said track assembly, and a hitch assembly joining adjacent said rear portion of one of said carriers with a front portion of the other of said adjacent carriers; and
a propulsion system that is adapted to propel said carriers along said track assembly;
wherein said track assembly comprises at least two rails that have a surface shape that is at least partially circular in cross section and wherein each of said trolleys comprises at least one V-oriented set of upper wheels at an upper portion thereof, said upper wheels each mounted on a plane that intersects the plane of the other of said upper wheels, wherein each of said trolleys includes at least one lower wheel below said upper wheels.

12. The system as claimed in claim 11 wherein said track assembly comprises at least two rails that are made substantially from a particular material and wherein each of said carriers includes a connection member extending between said hitch assemblies at opposite ends of that carrier, wherein said connection members and said hitch assemblies are made substantially from said particular material in order to provide thermal expansion and contraction of said carriers that is compatible with thermal expansion and contraction of said track assembly.

13. The system as claimed in claim 11 including a trolley at each said front corner portion and said rear corner portion.

14. A crossbelt sorter system, comprising:
a track assembly;
a plurality of carriers attached to each other to travel along said track assembly, each of said carriers comprising at least front and rear corner portions thereof, a trolley at at least one chosen from said front corner portion and said rear corner portion, said trolley is configured to travel along said track assembly, and a connection member connecting a front portion of said carrier to a rear portion of said carrier;
a hitch assembly joining adjacent said rear portion of one of said carriers with a front portion of the other of said adjacent carriers; and
a propulsion system that is adapted to propel said carriers along said track assembly, wherein said propulsion system includes a drive fin attached to said connection member, wherein said drive fin is propelled by a prime mover to propel said carriers.

15. The system as claimed in claim 14 wherein said track assembly comprises at least two rails that have a surface shape that is at least partially circular in cross section and wherein each of said trolleys comprises at least one V-oriented set of upper wheels at an upper portion thereof said upper wheels each mounted on a plane that intersects the plane of the other of said upper wheels.

16. The system as claimed in claim 14 wherein said drive fin is made from another particular material having thermal expansion and contraction characteristics that are different from the expansion and contraction characteristics of said particular material and wherein said drive fin is attached to said connection member with a slip joint.

17. A crossbelt sorter system, comprising:

a track assembly;

a plurality of carriers attached to each other to travel along said track assembly, each of said carriers comprising a lower carriage portion attached to the lower carriage portions of adjacent ones of said carriers and at least one upper carriage portion that is separably attached to said lower carriage portion, said upper carriage portion comprising a motorized roller, another roller, and a support for said rollers and a conveyor belt reeved about said rollers;

a propulsion system that is adapted to propel said carriers along said track assembly; and a divert trigger that is adapted to prompt said conveyor belt to discharge a load thereon to a particular location along said track assembly, wherein said divert trigger comprises a flag on one chosen from one of said carriers and said track assembly that is adapted to selectively interrupt a photo beam at the other of said one of said carriers and said track, wherein said flag is adapted to block said photo beam to prompt said conveyor belt to discharge a load thereon.

18. The system as claimed in claim 17 including mounts that are adapted to support said motorized roller, each of said mounts including a polymeric sleeve supporting an end of said motorized roller.

19. The system as claimed in claim 18 wherein each of said mounts includes an axle retainer, said axle retainer connected with said end of said motorized roller and supported by said polymeric sleeve.

20. The system as claimed in claim 19 wherein said axle retainer is adjustably connected with said end of said motorized roller.

21. The system as claimed in claim 17 including at least two of said upper carriage portions on one said lower carriage portion.

22. A crossbelt sorter system, comprising:

a track assembly;

a plurality of carriers attached to each other to travel along said track assembly and a plurality of trolleys at each of said carriers that are adapted to move along said track assembly, each of said trolleys including a bogie bracket supporting at least one wheel for supporting that trolley travelling along said track assembly, wherein said track assembly guides movement of said plurality of carriers; and a propulsion system that is adapted to propel said carriers along said track assembly, said propulsion system comprising at least one travelling member extending along a portion of said track assembly and engaging said bogie brackets of at least some of said trolleys sequentially to propel said carriers as those trolleys pass and said propulsion system.

23. The system as claimed in claim 22 wherein said track assembly is made up of at least two spaced apart rails and wherein said propulsion system comprises at least two travelling members, each extending along a portion of each of said rails.

24. The system as claimed in claim 22 wherein said travelling member comprises an endless travelling belt.

25. The system as claimed in claim 22 wherein said travelling member includes a force-reinforcing mounting, said force-reinforcing mounting being responsive to relative movement with one of said trolleys to increase force of contact between said travelling member and the contacting one of said trolleys.

26. A method of sorting articles, comprising:

positioning articles on individual conveyor belts of a crossbelt sorter, transporting the conveyor belts to particular destinations and discharging the articles at said particular destinations;

said transporting the conveyor belts comprising the conveyor belts being mounted to carriers, each of said carriers being coupled to other of said carriers and propelled along a track assembly;

said track assembly having curves in both vertical and horizontal planes at a same location and supporting said carriers to travel along said track assembly with trolleys, each of said trolleys comprises at least one wheel and a bogie bracket mounting said at least one wheel, wherein said bogie bracket of each of said trolleys is pivotally mounted to the associated one of said carriages and capable of pivoting in at least two different directions and wherein said bogie bracket of at least one of said trolleys is adapted to move with respect to the carrier in a third direction perpendicular to said at least two different directions in addition to being mounted to pivot in said at least two different directions to support the associated said carriers as it moves in said vertical and horizontal planes.

* * * * *